United States Patent
Specht (10) Patent No.: US 6,414,958 B1
(45) Date of Patent: Jul. 2, 2002

(54) FOUR-PORT SECURE ETHERNET VLAN SWITCH SUPPORTING SNMP AND RMON

(75) Inventor: Robert J. Specht, Morris Plains, NJ (US)

(73) Assignee: Electronic Data Systems Corporation, Plano, TX (US)

( * ) Notice: Subject to any disclaimer, the term of this patent is extended or adjusted under 35 U.S.C. 154(b) by 0 days.

(21) Appl. No.: 09/201,306

(22) Filed: Nov. 30, 1998

(51) Int. Cl.[7] .................................................. H04L 9/00
(52) U.S. Cl. ...................... 370/395.53; 370/401; 705/21; 709/249
(58) Field of Search .................................. 370/389, 401, 370/400, 463, 465, 229, 230, 235, 352, 353, 354, 355, 356, 395.1, 395.53; 705/21, 43; 709/249, 250

(56) References Cited

U.S. PATENT DOCUMENTS

| | | | | |
|---|---|---|---|---|
| 5,550,816 A | * | 8/1996 | Hardwick et al. | .......... 370/401 |
| 5,963,647 A | * | 10/1999 | Downing et al. | ............. 705/42 |
| 6,012,050 A | * | 1/2000 | Eaton et al. | ................... 705/42 |
| 6,067,585 A | * | 5/2000 | Hoang | .......................... 710/11 |
| 6,233,242 B1 | * | 5/2001 | Mayer et al. | ................ 370/412 |

* cited by examiner

Primary Examiner—Ricky Ngo
(74) Attorney, Agent, or Firm—Baker Botts LLP (57) ABSTRACT

A multi-port switch is provided having an Ethernet switching section for connecting and switching among network devices and includes at least three ports, a network management module operating according to SNMP, and a monitoring module operating according to RMON. The switch can arrange the ports to operate as virtual local area networks ("VLANs"). The switch is secured with a network element that is part of a network device. In a system including the multi-port switch, an automated teller machine local area network is connected to one port, a customer data LAN is connected to a second port, and a router is connected to a third port. The switch arranges the three port connections into two VLANs, each VLAN including the router. The switch alternately switches between the VLANs in order to enable the ATM LAN and the customer data LAN to communicate with an external network. The switch is secured with or located inside one of the ATMs in the ATM LAN.

19 Claims, 6 Drawing Sheets

FOUR-PORT SECURE ETHERNET VLAN SWITCH SUPPORTING SNMP AND RMON

FIELD OF THE INVENTION

This invention relates to switches used in local and wide area networks, and network systems including such switches.

BACKGROUND OF THE INVENTION

Because of their convenience, speed, and all-hour availability, automated teller machines ("ATMs," also called "automatic teller machines") are fast becoming an ubiquitous sight in many places other than banks. Aside from the traditional services available at ATMs, such as withdrawing and depositing cash, requesting balances, making loan payments, and transferring funds, ATMs can also be used for providing postage stamps and dispensing discount coupons. Other future convenient uses are being planned. This expansion of services, coupled with the ability of ATM owners to charge users fees, will result in increasing numbers of ATMs being installed at retail locations remote from any bank.

Many retail stores in which ATMs may be located already have communications networks installed because of credit card processing requirements or because the retail stores are part of communications links to other stores in a retail chain. For stores that are part of a retail chain, such an existing network promotes, for example, uniform pricing strategies and ordering procedures and monitoring of the chain's inventories, whether held at a central warehouse or at other stores in the chain.

Figure 1A:
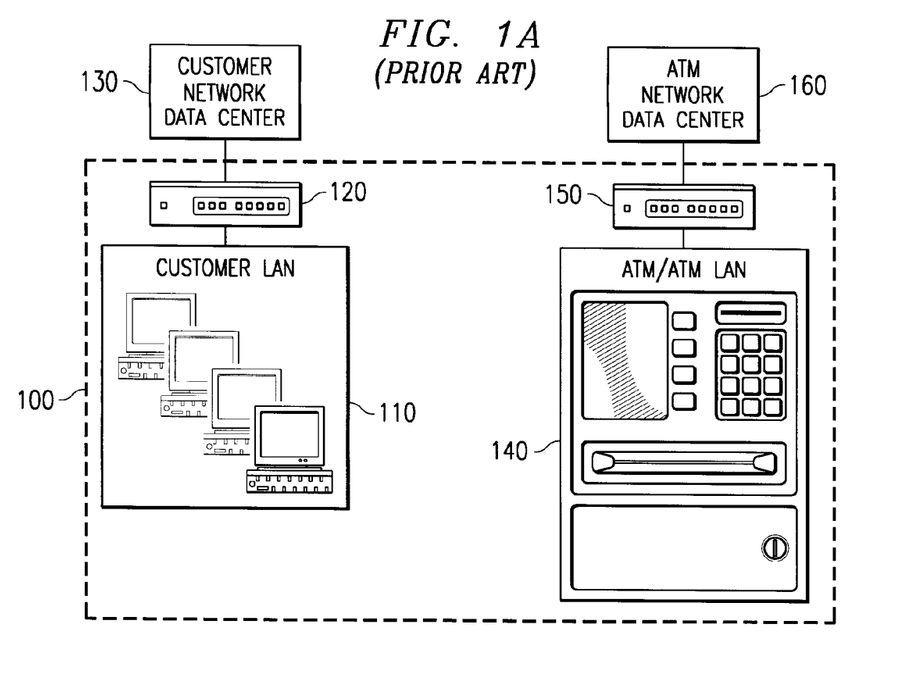
FIG. 1A is a block diagram of a prior art system illustrating separate data networks.

Because ATM data traffic contains sensitive information, there are security considerations involved in installing ATMs in remote locations. One way to keep data traffic from an ATM secure is to use a dedicated network connection. FIG. 1A shows retail location 100 in which a connection from customer local area network ("LAN") 110 to customer network data center 130 already exists through router 120. Customer LAN 110 may include cash registers, credit card terminals, and other store-based machines connected to a customer network. Router 120 manages communications between customer LAN 110 and customer network data center 130. A dedicated ATM connection requires connecting ATM LAN 140 to ATM network data center 160 via additional router 150 and other equipment not shown. ATM LAN 140 is depicted in FIG. 1A as a single ATM but could include one or more ATMs. An example of ATM network data center 160 is a data center operated by Electronic Data Systems Corporation, assignee of the present invention.

A dedicated ATM network connection in retail location 100 which already has a customer LAN in place would be secure, but it would require a duplication of the equipment and facilities used for the network already in place. This duplication could easily cost a proprietor as much as $15,000 or more, and would be more than double the cost of the existing installation. In addition, there would be twice as much equipment to control and monitor.

Because adding a separate data network connection for an ATM would not be cost-effective for a proprietor, an alternative is to share existing resources between the two LANs. This can be done by combining the ATM LAN traffic and customer LAN traffic onto a single wide area network ("WAN") connection, and from there communicating with the customer network and the ATM network data centers. A conventional way of combining data traffic is by using a shared Ethernet hub, as pictured in FIG. 1B. In that figure, ATM LAN 140 and customer LAN 110 are connected to shared Ethernet LAN 170, which is connected to shared hub 180. Shared hub 180 is connected to WAN 190 via router 120, and WAN 190 is connected to customer network data center 130 and ATM network data center 160. WAN 190 may also be a frame relay network or a satellite network. Using an Ethernet LAN allows any device attached to the LAN to receive all data flowing on the LAN. In order to control this traffic, each data packet header contains the address of the destination machine. Ethernet protocols send data packet information to all the machines on the same network, and each machine receives the information destined for it based on the destination address.

Figure 1B:
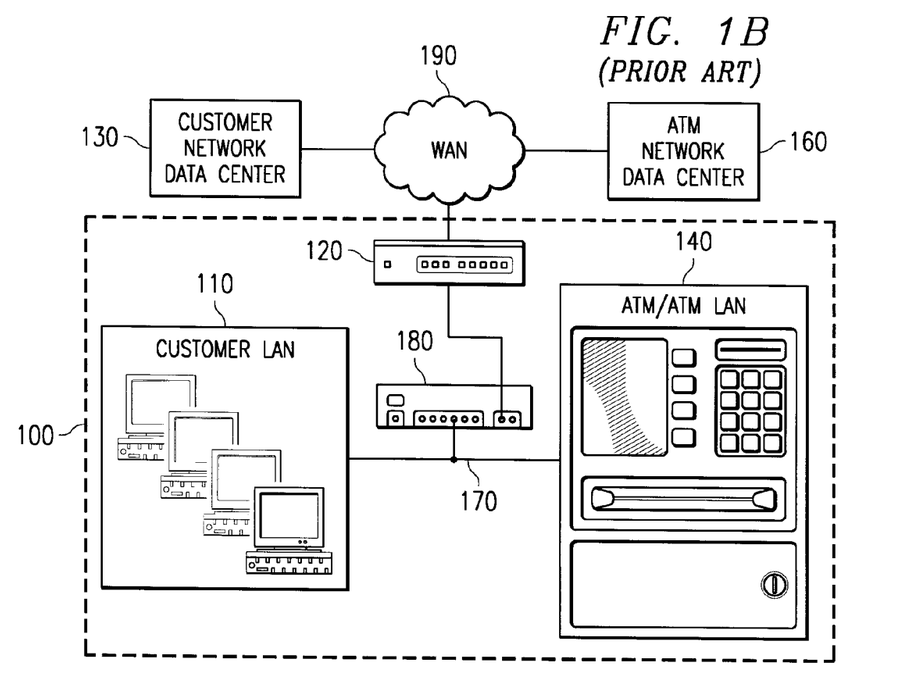
FIG. 1B is a block diagram of a prior art system illustrating data networks sharing an Ethernet LAN.

In exchange for the small expense of adding a shared hub and an Ethernet LAN, this network combination has only one router and one connection to a network. The system of FIG. 1B is much less expensive than the separate networks of FIG. 1A, and its installation and management are simplified.

This system, however, is not secure. Even though only the machine having the address matching the address of the packet header is supposed to accept the packet, it is possible in this system for a machine operating in "promiscuous" mode to accept all packets regardless of the address in the packet header. It is fairly easy for anyone to observe the data traffic flowing over this Ethernet, and programs to accomplish this are easily available on the Internet, for instance. Also freely available throughout the Internet are other methods of attacking an ATM LAN, such as wiretapping the phone line over which the ATM LAN operates. Wiretapping monitors data traffic over a phone line and can make a standalone ATM vulnerable by placing a tap anywhere between the ATM and the host computer.

Therefore, to have an ATM LAN share facilities with a customer LAN is problematic—the customer can interact with the ATM and can see and intercept ATM data. Within a retail location, the risk is great that a disgruntled employee or thief will attempt to exploit an installed ATM LAN with a minimal risk of being caught. Anyone with a laptop computer can easily obtain access to the ATM LAN. In addition, once the Ethernet LAN is compromised, the WAN too is compromised because an intruder will have easy access to the wider network. The goodwill of the ATM network administrator will eventually suffer.

Because of this lack of security and broadcast control, it is not acceptable to use a shared Ethernet LAN. One solution to these security problems is to use an Ethernet switch with virtual LAN ("VLAN") capabilities. A virtual (or logical) LAN is a local area network that maps workstations connected to it on a basis other than by geographic location, such as, for example, by department, type of user, or primary application. The VLAN controller is able to reconfigure the connections in order to manage load balancing and bandwidth allocation more easily than by using a physical picture of the LAN. Network management software keeps track of relating the virtual picture of the local area network with the actual physical arrangement.

A VLAN may encompass one or more switch ports and it may operate between any port or ports. This ensures that stations connected to ports that are not members of the VLAN do not receive broadcasts, and data traffic produced by a station in one VLAN is delivered only to stations within that same VLAN. Implementing secure VLANs makes network administration more efficient and secure.

Setting up VLANs in such circumstances solves the problem of isolating the ATM LAN data and preventing unauthorized access to ATM LAN data. However, other issues arise with respect to administering ATM LANs in locations remote from the network administration center. Two features of network administration that are used to adequately manage, maintain, and monitor a network are Simple Network Management Protocol ("SNMP") and Remote Network Monitoring Specification ("RMON").

SNMP is a simple request and response Internet protocol used for governing network management. Among other things, SNMP is used for alert and alarm notification. For instance, if a remote ATM is replaced by another device, SNMP will detect an error and report back to the network administrator that the port to which the ATM was connected has been closed and that the device connected to that port is reporting a media access control ("MAC") address that does not match the ATM's MAC address. SNMP will also detect if there is loss of connectivity to the ATM. Other examples are: determining whether a machine needs service if it resets; and detecting an event that is unusual or improper based on the circumstances, such as a device being active at 3 o'clock in the morning in a store that is only open until midnight.

SNMP is a standard Internet protocol, defined in several Requests for Comments ("RFCs"). There are two versions of SNMP—version 1 ("SNMPv1") and version 2 ("SNMPv2"). RFC 1157, entitled "A Simple Network Management Protocol," is one of the RFCs that define SNMPv1; RFCs 1441–1452 define SNMPv2.

RMON is an extension of SNMP and allows network administrators to monitor a network remotely, for instance, from the system headquarters or from the ATM network data center. Using RMON, administrators can monitor, for example, how much traffic is coming from the ATM LAN and how much is coming from the customer LAN when both LANs are located at a customer's remote site. Having a remote monitoring capability improves planning, billing, troubleshooting, and network performance tuning. RMON is a standard Internet specification, defined in RFC 1757. There is also a later version of RMON called RMON 2, defined in RFC 2021.

Switches having both of these capabilities are found in the prior art. For instance, NBase Communications of Chatsworth, Calif., manufactures the NH 2032 Ethernet/Fast Ethernet switch. This switch contains sixteen dual-speed ports (operating at 10 Mbps and 100 Mbps) and has the capability to include as many as sixteen additional Ethernet/Fast Ethernet and other type ports. The NH 2032 also supports VLANs. The switch's dimensions are approximately 48 cm W×48 cm D×9 cm H (19" W×19" D×3.5" H), and the switch is designed to fit into a standard 19"-wide rack that sits in a central network site.

For several reasons, this type of switch cannot be used in a customer's location to provide switching for an ATM LAN and a customer LAN. First, because of its size, the switch must be rack-mounted, and a rack is generally not available in a remote retail location. Second, even if a rack were available, the switch would likely be in an area of the store accessible to the public, or at least accessible to store employees, such as in a storage room. In such a situation, having access to the rack provides unmonitored and unauthorized access to the ATM LAN data traffic.

A smaller switch, one that can be secured with an ATM or can fit inside a locked ATM, is needed. Switches of that size exist—however, their features are limited. One switch, Cisco 1548 Micro Switch 10/100, manufactured by Cisco Systems, Inc., of San Jose, Calif., is approximately 28 cm W×23 cm D×8 cm H (11" W×9" D×3" H), potentially small enough to fit into a locked ATM. It contains eight dual-speed ports operating at 10 and 100 Mbps. It supports SNMP, but it does not support VLANs or RMON, features that are desirable when installing an ATM LAN in a remote retail store location.

SUMMARY OF THE INVENTION

It would, therefore, be advantageous to have a switch that addresses the above-noted problems and drawbacks of currently available Ethernet switches. It would be advantageous to provide a switch that is small enough to be secured with a network device, such as an ATM, preferably by being locked inside the network device, and that has network management, remote monitoring, and virtual LAN capabilities, so that only authorized personnel would have access to the switch and to the data going through it.

In accordance with the present invention, a switch having an Ethernet switching section is provided for connecting network devices. The switch includes at least three ports connected to the switching section and a network management module which is also connected to the switching section. The switch is capable of arranging the ports to operate in virtual local area networks. The switch is secured with a network device, and is preferably located within the network device.

Preferably, the switch also includes a monitoring module. It is preferable that the monitoring module support RMON and the network management module operate according to SNMP.

Preferably, one of the ports is connected to a router, one of the ports is connected to an ATM or an ATM LAN, and one of the ports is connected to a customer LAN. The customer LAN preferably includes at least one cash register, and may also include a credit card terminal. Alternatively, the credit card terminal may be attached to a fourth port separate from the cash register. Preferably, the switch arranges the router port and the ATM LAN port into one VLAN and arranges the router port and the customer LAN port into another VLAN. In addition, the second VLAN can include the port to which the credit card terminal is attached, or a third VLAN can include the router port and the credit card terminal port.

In accordance with the invention, a system for switching data traffic over a communications network includes a switch having at least three ports, that supports SNMP and RMON, and is capable of arranging its ports into VLANs. A network device is connected to each of at least three of the ports, and two VLANs are arranged, each VLAN including at least two of the ports. The switch is secured with at least one of the network devices.

In a preferred system embodiment, a router which routes signals to an external network is connected to the first port and is included in two VLANs. One VLAN also includes the second port, and the other VLAN also includes the third port, allowing the system to switch between the two VLANs to enable the external network to communicate alternately with the network devices connected to the second and third ports. Preferably, an ATM or ATM LAN is connected to the second port and a customer LAN is connected to the third port.

In another embodiment, the switch has a fourth port, and a third VLAN includes the first port (connected to the router) and the fourth port. Preferably, the fourth port of the first switch is connected to a port of a second four-port switch, network devices are connected to ports of the second switch, and ports of the second switch are arranged into VLANs.

In another system embodiment, one VLAN includes the first three ports of the switch, and a second VLAN includes the third and fourth ports. This configuration can arrange into the first VLAN a LAN, a router connected to an external network, and a LAN supervisor, and into the second VLAN the supervisor and a server.

In another configuration of this latter two-VLAN arrangement, one network user is connected to the first port, a router that routes signals to a wide area network is connected to the second port, a second user is connected to the third port, and a second router, which routes signals to an external network, is connected to the fourth port.

For a better understanding of the invention, together with other and further objects, reference is made to the following description, taken in connection with the accompanying drawings, and its scope will be pointed out in the appended claims.

Throughout the figures, unless otherwise stated, the same reference numerals and characters are used to denote like features, elements, components, or portions of the illustrated embodiments. Moreover, while the subject invention will now be described in detail with reference to the figures and in connection with the illustrative embodiments, changes and modifications can be made to the described embodiments without departing from the true scope and spirit of the subject invention as defined by the appended claims.

DESCRIPTION OF THE PREFERRED EMBODIMENT

In accordance with the present invention, a multi-port switch is provided which supports VLAN, has network management and remote monitoring modules, and is secured with or inside a network device connected to one of the ports of the switch. The switch allows a network administrator to control how devices that are part of a network can be connected to communicate with each other, at the same time being able to share network resources. Moreover, the switch has both security features and management capabilities, allowing the administrator to access management information such as the addresses of the devices connected to the switch, the configuration of the VLANs, and data traffic statistics for each port.

The virtual networking capabilities of the switch operate as follows. When a data packet arrives at a port on the switch, the switch must identify at which port it is arriving and to which port it is going. If the originating port and the destination port are members of the same VLAN, the packet is allowed to pass. The switch might then perform further filtering on that packet based on additional restrictions, for example, that data traffic is allowed to travel from the originating port to the destination port, but not in the reverse direction. If the destination port and the originating port are not in the same VLAN, the packet is dropped.

Thus, virtual networking also enhances network security. For example, the switch learns the device address of every device connected to it. In some instances, not every port will be connected to a device. The switch can be configured to drop data packets from a port to which the switch knows a device is not connected. The switch can also be configured to prevent a device from ever being connecting to such an unconnected port or, alternatively, to permanently connect a certain device to a port. These capabilities allow forwarding of data packets only for trusted machines, and would prevent an unauthorized device from gaining access to the entire network.

The switch may also be used to dictate one-way access. For example, of the four ports, three ports are connected to users and one port is connected to a printer. The printer only has to be able to listen to the users and print what is sent to it. There is no need for a printer to send data to the users. Therefore, the switch can lock out any data packets flowing from the printer to the users. This may occur if an unauthorized person were to try to enter the network via the printer port, unplug the printer, and plug in a laptop computer to that port. The switch would recognize that data packets should not flow from the printer port, and the switch would close off access from that port.

A system using the switch of the present invention is also described with respect to an application in a secure switching system. A wide area network is connected to several local area networks through the switch, in which data traffic on the local area networks is isolated from each other. This isolation occurs using the multi-port Ethernet switch with SNMP and RMON capabilities, connecting to each port a local area network, connecting a router to one of the remaining ports, and arranging VLANs, each of which comprises the router port and one of the local area networks. This arrangement allows data on each local area network to be routed through the router to the wide area network without the data being seen by other local area networks not within the same VLAN. The switch is small enough to be secured with or inside a network element that is part of one of the local area networks to prevent unauthorized access to the switch, and, possibly, to the data traffic on the local area networks.

In a preferred embodiment, one of the local area networks is an ATM LAN whose data traffic must be secure, and another local area network is a customer LAN whose data traffic is not required to be secure. While the system is described using a secure ATM LAN and an unsecured data network, those familiar with the art will recognize that the present invention can be applied to a broad range of local area networks sharing resources, including, for example and not by limitation, local area networks comprising office computer terminals, a server network, or two or more networks each of which is secure.

The preferred system must isolate ATM data traffic from customer data traffic while allowing the router to be able to communicate with both the ATM LAN and the customer LAN. Two VLANs are set up each having access to a shared network resource such as the router, but otherwise are blind to each other. The first VLAN includes the ATM LAN and the router; the second VLAN includes the customer LAN and the router. Within each VLAN, the members are allowed to talk to each other; however, they are not allowed to talk to members of the other VLAN. Thus, each VLAN can talk to the router, which is shared between the VLANs. Using a switch according to the present invention allows the data networks to be combined onto one network while isolating ATM data traffic from customer data traffic. Moreover, because of the small size of the switch, the switch can be placed with or locked inside one of the network elements such as an ATM, severely curtailing unauthorized access to the switch.

Figure 2:
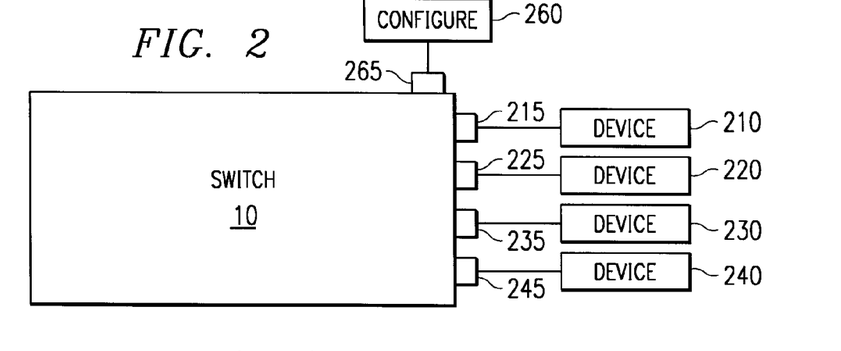
FIG. 2 is a block diagram of an exemplary system according to the present invention.

Referring to FIG. 2, there is shown a system according to a preferred embodiment which includes switch 10, a configuration device 260, and network devices 210, 220, 230, 240 each connected to a port of switch 10. Switch 10 has four ports 215, 225, 235, 245, each of which may be connected to a network device. Network devices 210, 220, 230, 240 may include discrete network elements such as computers, workstations, terminals, routers, hubs, other switches, and terminal servers. Alternatively, network devices can include workgroups or networks made up of discrete network elements. Not every port must be connected to a network device.

Configuration device 260 is preferably a computer or a computer interface that is used to program the virtual connections of switch 10. The software that controls the configuration can be kept within switch 10 or can be kept within configuration device 260 with appropriate connections between the two devices to configure switch 10. Configuration device 260 connects to switch 10 via configuration port 265. An example of one configuration arranged by configuration device 260 is to virtually connect ports 215 and 225, i.e., place ports 215 and 225 within a VLAN. Other configurations may include virtually connecting ports 235 and 245 into a VLAN, virtually connecting ports 215, 225, and 245 into a VLAN, or virtually connecting ports 225, 235, and 245 into a VLAN. Still other configurations may include default arrangements in which no port is virtually connected to any other port, or all ports are connected to each other, possibly for maintenance or troubleshooting of the switch or the system. Because the number of ports may be limited, so may the number of port configurations.

Figure 3A:
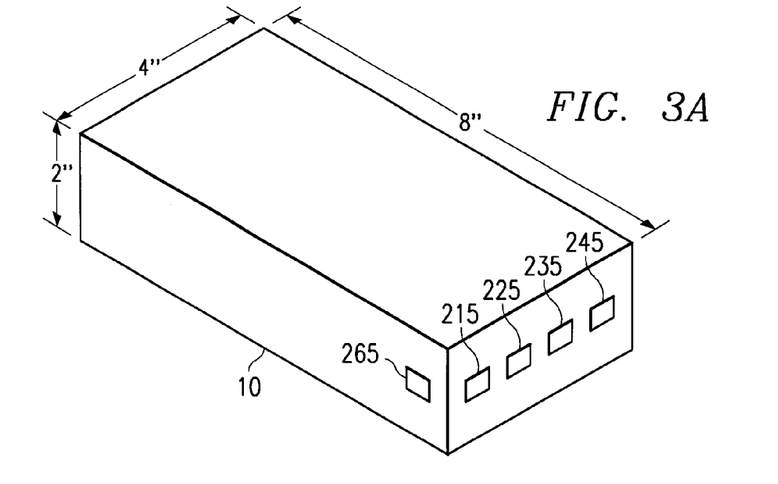
FIG. 3A is a diagram of an exemplary switch according to the present invention.
Figure 3B:
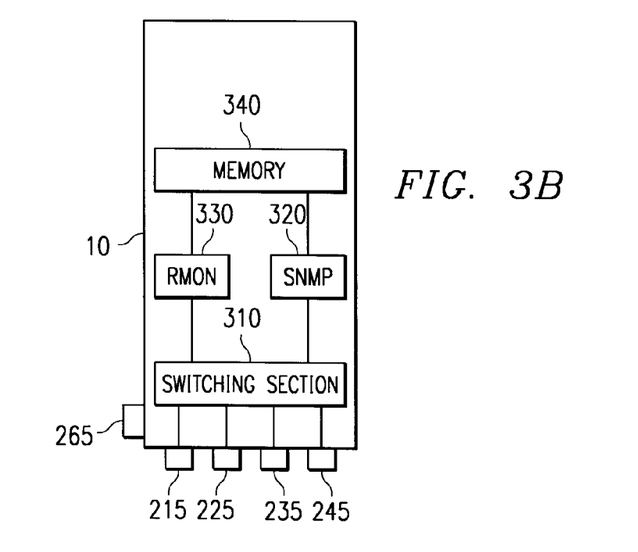
FIG. 3B is a block diagram of an exemplary switch according to the present invention.

An exemplary embodiment of switch 10 is shown in greater detail in FIGS. 3A and 3B. Switch 10 is small enough that it may preferably be secured with or inside of a network element that is part of any of the network devices connected to a port of the switch. As shown in FIG. 3A, typical dimensions of switch 10 are four inches wide by eight inches deep by two inches high (approximately 10 cm W×20 cm D×5 cm H), with maximum practical dimensions approaching six inches wide by ten inches deep by three inches high (approximately 15.2 cm W×25.4 cm D×7.6 cm H). These maximums are limited by the space in which switch 10 must fit. Switch 10 may have as few as three ports. The maximum number of ports that switch 10 may have is limited only by the requirement that switch 10 remain small enough to fit inside one of the network elements that is part of a network device connected to the ports of the switch. In practical terms, though, port arrangements are available only in groups of four. Thus, having four ports is preferred, but having eight ports is possible so long as the switch can still fit inside one of the network elements. Having too many unused ports defeats some of the cost efficiencies of having a small switch.

Ports 215, 225, 235, 245 preferably accommodate unshielded twisted pair ("UTP") wire connections, both UTP category 3 wire, often used for telephone lines, and higher-grade UTP category 5 wire, having RJ-45 modular connectors. Alternatively, these ports can accommodate coaxial or fiber optic cable, with appropriate connector adaptations. Each port preferably operates at both 10 Mbps (Ethernet) and 100 Mbps (Fast Ethernet), although faster speeds such as 1000 Mbps (Gigabit Ethernet) may be possible, so long as the size of the switch remains small enough to fit inside a network element. In addition to operating with Ethernet and Fast Ethernet, switch 10 can also operate as part of systems involving token-ring and fiber distributed-data interface ("FDDI") technologies.

Configuration input 265 is preferably a parallel connection and preferably accommodates UTP wire, but other types of wire may be used. Alternatively, the configuration can be performed via a serial connection using RS-232 connectors. Configuration input 265 is not always needed, because configuration can be performed using one of the device ports.

Within switch 10 are several modules, shown as blocks in FIG. 3B. These modules are switching section 310, SNMP module 320, RMON module 330, and memory 340. Although shown as separate blocks, the latter three modules may physically be part of one integrated circuit board or chip. Switching section 310 is connected to ports 215, 225, 235, 245 and makes the required connections between the ports in order to virtually connect them according to the switch configuration programmed by configuration device 260. Switching section 310 is a switching chip set that contains the logic that controls the Ethernet protocols and physical wiring connected to the ports. Although switching section 310 preferably supports Ethernet/Fast Ethernet technology, other technologies may be supported, as previously discussed.

SNMP module 320 implements management and security of the devices and networks connected to switch 10, according to the Simple Network Management Protocol versions, as previously discussed. Having an SNMP capability requires switch 10 to have memory, such as memory module 340, in addition to the base level of memory used to support the basic operation of any switch. Although memory module 340 is shown as a separate module in FIG. 3B, it could also be part of SNMP module 320.

Switch 10 also includes RMON module 330 which allows network administrators to monitor the network remotely, from the system headquarters, for example. Larger prior art switches include an RMON module within the switch unit. Smaller prior art switches do not include an RMON module and must access a separate, external module to perform remote monitoring. In the present invention, the RMON module 330 is contained within the switch unit, but the switch unit retains its small size. Associated with RMON module 330 is memory module 340, shown as the same module as used with SNMP module 320, but which can also be a separate memory module dedicated to RMON module 330.

Figure 4:
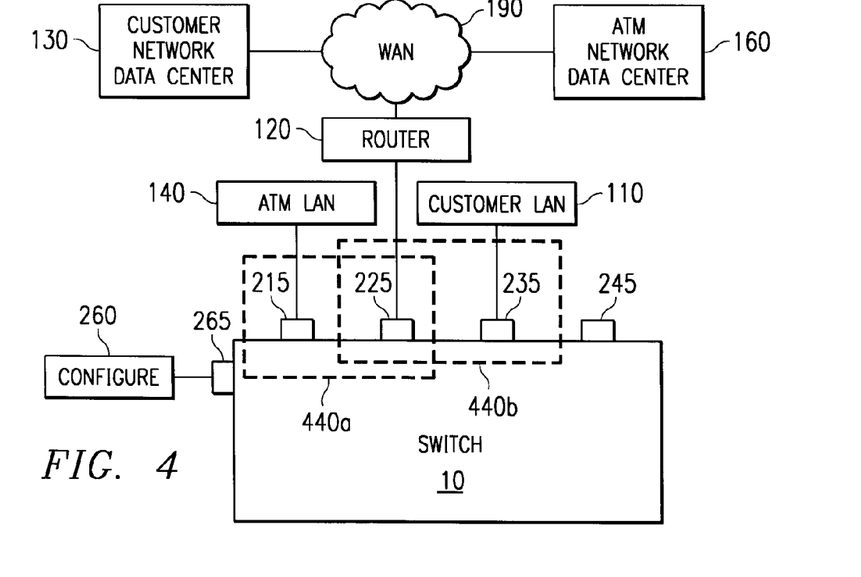
FIG. 4 is a block diagram of one embodiment of a system according to the present invention.

Referring to FIG. 4, there is shown a block diagram of one embodiment of a system according to the present invention. Included in the system of FIG. 4 are switch 10, ATM LAN 140 connected to port 215, router 120 connected to port 225, WAN 190 connected between router 120 and customer network data center 130 and ATM network data center 160, customer LAN 110 connected to port 235, and configuration device 260. Each of these devices has been described before. As before, ATM LAN 140 may include one or several ATMs.

In the system of FIG. 4, ports 215 and 225 are configured as VLAN 440a comprising ATM LAN 140 and router 120. Similarly, ports 225 and 235 are configured as VLAN 440b comprising router 120 and customer LAN 110. VLAN 440a and VLAN 440b are isolated from each other by switch 10. Thus, ATM data traffic cannot be seen by customer LAN 110, but it can communicate with router 120; customer LAN traffic cannot be seen by ATM LAN 140, but it can communicate with router 120; and router 120 can see both the ATM data traffic and the customer LAN traffic. Using this configuration, ATM network data can communicate with WAN 190 via router 120 and VLAN 440a, and customer data can communicate with WAN 190 via router 120 and VLAN 440b. Only those with access to router 120 (a secure device) can have access to both ATM LAN 140 and customer LAN 110. Switch 10 is small enough to be secured with or locked inside an ATM in ATM LAN 140.

Internal to switch 10, SNMP is supported and can manage both ATM LAN 140 and customer LAN 110, so long as those networks are connected to switch 10. Similarly, a network administrator can access RMON module 330 from system headquarters over WAN 190 and through router 120 to alternately monitor ATM LAN 140 or customer LAN 110.

Figure 5:
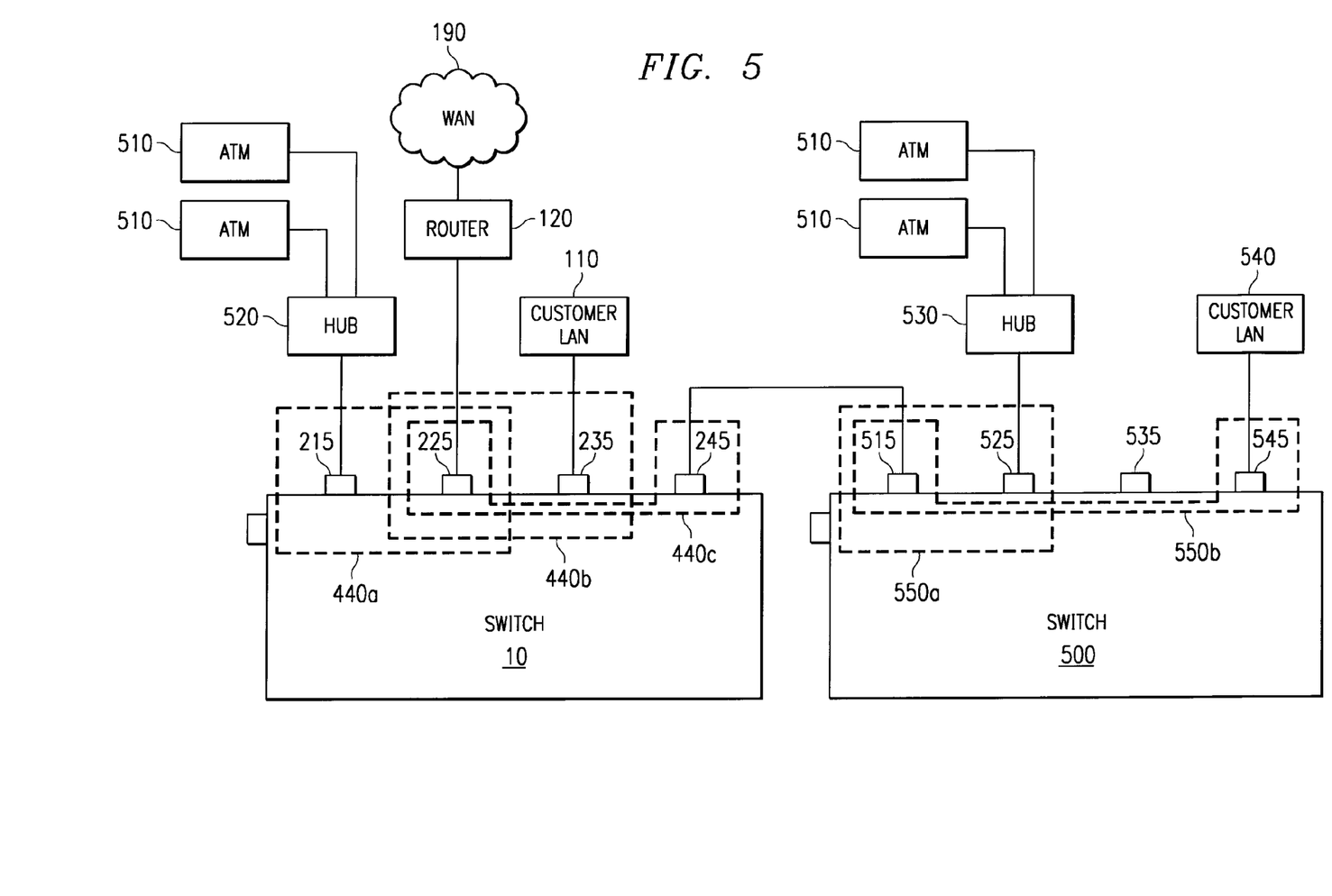
FIG. 5 is a block diagram of another embodiment of a system according to the present invention.

FIG. 5 is a block diagram of another embodiment of a system according to the present invention. The system of FIG. 5 is a variation on the system of FIG. 4 and includes additional switch 500, which operates identically to switch 10. ATM LAN 140 is represented by hub 520 to which is connected two ATMs 510. More than two ATMs could be connected to port 215 through hub 520. A fourth port, port 245, can accept a single network device or can be used to augment the ports available to use by switch 10. This "piggybacking" is accomplished by setting up a third VLAN 440c that includes ports 225 and 245. This VLAN would allow devices connected to switch 500 to connect to router 120, but they would be isolated from the devices on the other ports of switch 10. As shown in the example in FIG. 5, port 515 of switch 500 is connected to port 245 of switch 10. Connected to port 525 is another ATM LAN comprising hub 530 and two more ATMs 510. Connected to port 545 is a second customer LAN 540. The ports of switch 500 can also be arranged in VLANs. Thus, VLAN 550a can comprise ports 515 and 525, allowing the ATM LAN connected to port 525 to communicate with port 515 and then with router 120 connected to switch 10. Similarly, VLAN 550b can comprise ports 515 and 545, allowing customer LAN 540 to communicate with port 515 and then with router 120 connected to switch 10. The arrangement of FIG. 5 effectively extends the capabilities of switch 10 to five or more ports.

Figure 6A:
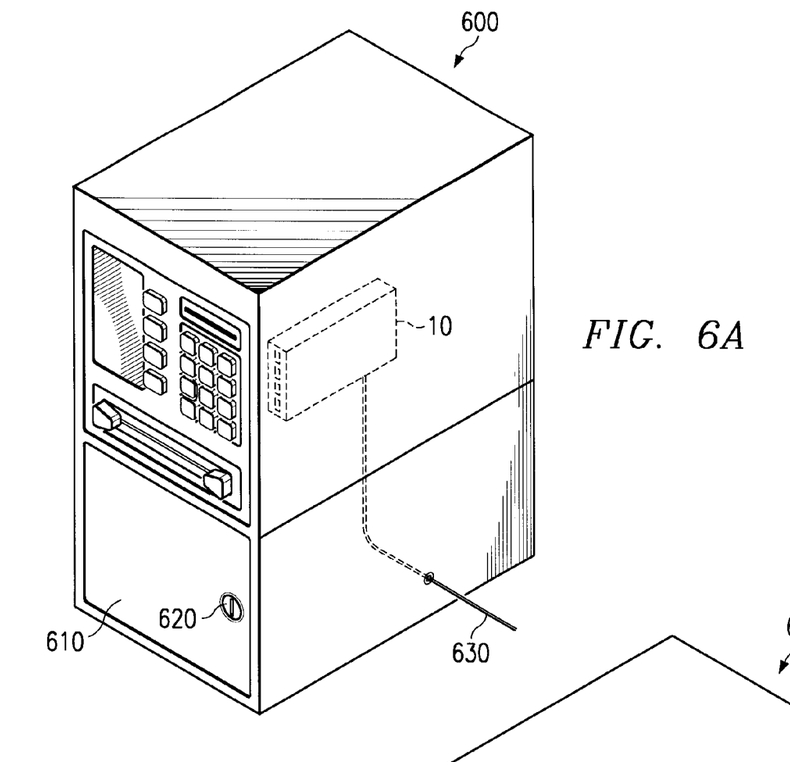
FIG. 6A is a frontal perspective view of an automated teller machine illustrating one implementation of a switch according to the present invention.
Figure 6B:
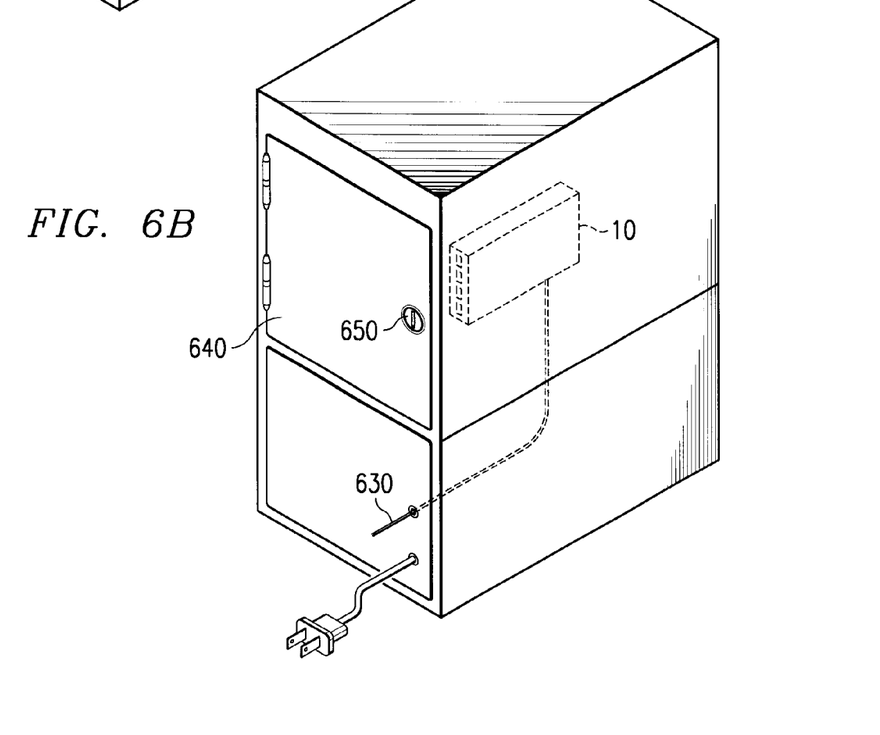
FIG. 6B is rear perspective view of an automated teller machine depicting another implementation of a switch according to the present invention.

FIGS. 6A and 6B show two views of an ATM 600 depicting two ways in which switch 10 may be installed according to the present invention. ATM 600 is of a conventional size and shape. ATM 600 may be self-supporting (as shown) or may be installed through a wall of a customer's establishment. FIG. 6A is a perspective view of the front of ATM 600. On the front of ATM 600 is panel 610 which is locked using lock 620 and which may only be unlocked by persons having authorized access to ATM 600. Switch 10 is shown as being behind panel 610 when the panel is closed and locked. Because of its small size, switch 10 fits inside of ATM 600. Also connected to switch 10 through an access hole in the side of ATM 600 is cable 630. Cable 630 provides access to switch 10 by customer LAN 110 and router 120. Switch 10 can be secured when locked within ATM 600.

Alternatively, as shown in another perspective view in FIG. 6B, ATM 600 may be accessed from the back through panel 640. Panel 640 is locked using lock 650. Switch 10 is shown as being behind panel 640 when the panel is closed and locked. Again, cable 630 is shown that connects to customer LAN 110 and router 120.

Figure 7:
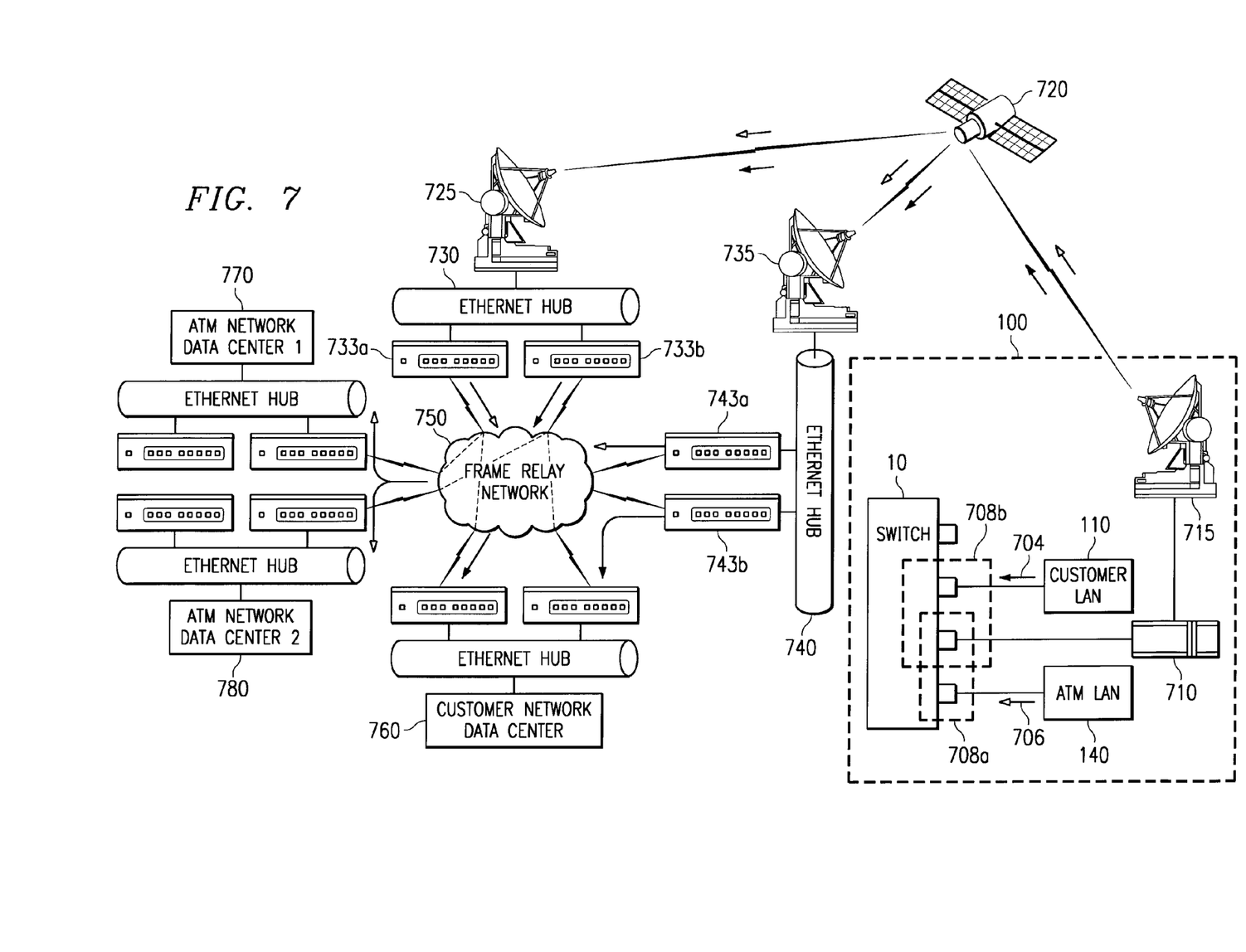
FIG. 7 is a block diagram of a broader view of a system according to the present invention.

FIG. 7 is a block diagram depicting a broader view of a system according to the present invention. The system of FIG. 7 uses a satellite communications network having master satellite stations 725, 735, customer satellite dish 715, RF converter 710, and satellite 720 to deliver, via various routers and frame relay network 750, customer transaction data between customer LAN 110 and customer network data center 760 and ATM data between ATM LAN 140 and ATM network data centers 770, 780. Data traffic from customer LAN 110 is indicated by arrow 704 and other black-headed arrows. Data traffic from ATM LAN 140 is indicated by arrow 706 and white-headed arrows. Customer LAN 110 and ATM LAN 140 have separate network addresses, for example, 10.0.0.0 and 11.0.0.0, respectively, so that the data traffic from these networks may be properly routed. VLAN 708a comprises ATM LAN 140 and RF converter 710, and VLAN 708b comprises customer LAN 110 and RF converter 710.

As shown in FIG. 7, when appropriately switched by switch 10, in a transmission from customer retail location 100, RF converter 710 transmits data from both customer LAN 110 and ATM LAN 140 via satellite dish 715 to satellite 720. Satellite 720 transmits the data to master satellite stations 725, 735 which convert the satellite signals to baseband electrical signals. Master stations 725, 735 have associated Ethernet hubs 730, 740 that recognize which data traffic belongs to which network. ATM network data is routed using routers 733a, 743a to frame relay network 750 and then to ATM network data centers 770, 780. Customer network data is routed using routers 733b, 743b to frame relay network 750 and then to customer network data center 760. At each data center are a pair of routers, one for each master station, and an Ethernet hub.

Although FIG. 7 depicts satellite broadcasting, it should be understood that the system of the invention is not confined to satellite broadcast of these data. Other data delivery techniques between frame relay network 750 and switch 10 might include, for example, an ISDN high bandwidth telephone link, a fiber optic link, or a coaxial cable, such as for sending data over television cable systems.

Figure 8A:
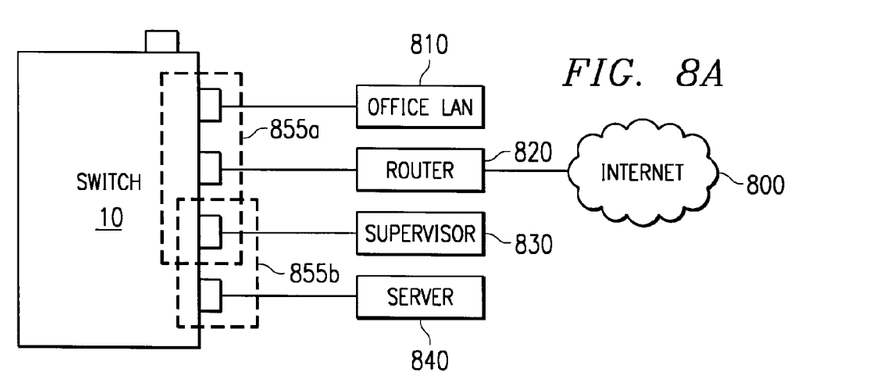
FIG. 8A is a block diagram of another embodiment of a system according to the present invention.
Figure 8B:
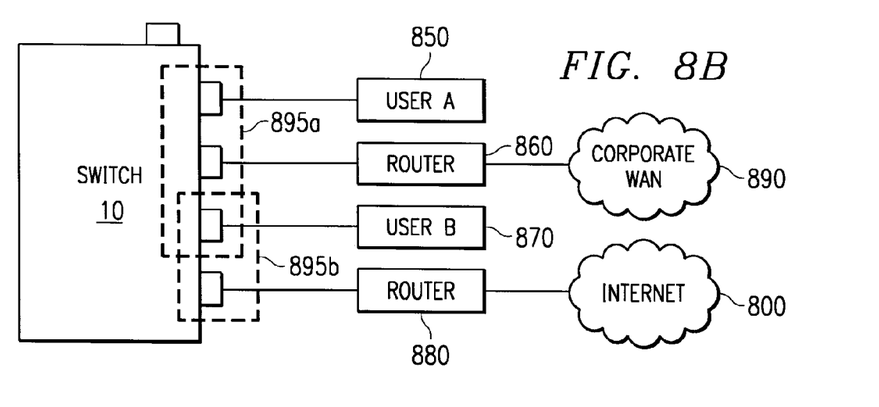
FIG. 8B is a block diagram of a further embodiment of a system according to the present invention.

While the exemplary system described relates to an ATM or ATM LAN sharing system resources with a customer LAN, a similar system can be used with respect to other network arrangements, such as those within a small office or within a commercial establishment. FIGS. 8A and 8B are block diagrams of other embodiments of the system according to the present invention. FIG. 8A shows a typical office connection involving an office LAN 810 served by a server 840 and having a supervisor's workstation 830. Switch 10 allows supervisor's workstation 830 to access server 840, but does not allow office LAN 810 to access server 840. The network devices are connected to three of the ports of switch 10. As shown in FIG. 8A, router 820 can be connected between the remaining port and the Internet 800.

Alternatively, router 820 and Internet 800 can be replaced by a dial-in network, for example, or a dial-in network can be additionally provided on a second switch (not shown) that is piggybacked onto switch 10, as was previously shown in FIG. 5 to increase the available number of ports. Two VLANs are shown in FIG. 8A. The first VLAN 855a includes office LAN 810, router 820, and supervisor's workstation 830. This allows office LAN 810 to talk to both the supervisor and router 820 (and thereby connect to Internet 800). The second VLAN 855b includes only supervisor's workstation 830 and server 840. Only the supervisor has access to server 840. Because of switch 10's small size, it can fit inside server 840 or within another network element that can be secured to prevent unauthorized access.

FIG. 8B is an example of another small office configuration using switch 10. This system allows specified users limited access to external networks such as the Internet or a corporate wide area network. This system includes two users 850, 870 and two routers 860, 880. Users 850, 870 could be, for example, a subordinate and a boss, respectively. Router 860 is connected to the corporate WAN 890; router 880 is connected to the Internet 800. As the boss, user 870 has access to everything else—user 850, the Internet 800, and corporate WAN 890. As the subordinate, user 850 has access to user 870 and corporate WAN 890 only—access to the Internet 800 is blocked. In addition, someone communicating from the Internet 800 only has access to user 870, but not to user 850 or corporate WAN 890.

To satisfy these requirements, two VLANs 895a, 895b are set up. VLAN 895a includes three ports, to which are connected the two users and the router connected to the corporate WAN. VLAN 895b includes the fourth port and one of the ports connected to VLAN 895a. The boss and the router connected to the Internet are connected to the ports in VLAN 895b. This arrangement permits user 870 to communicate with the other three ports, but restricts user 850 from communicating with the port connected via router 880 to the Internet. To keep these access requirements secure, switch 10 can be secured with or locked inside user 870's workstation.

While there have been described what are believed to be the preferred arrangements and methods according to the invention, those skilled in the art will understand that other changes and modifications may be made thereto without departing from the spirit of the invention and it is intended to claim all such changes and modifications as fall within the true scope of the invention.

I claim:

1. A switch for connecting network devices, said switch having an Ethernet switching section and comprising:
   at least first, second, and third ports connected to said switching section;
   a monitoring module connected to said switching section, said monitoring module monitoring activity of said ports, wherein said monitoring module supports a remote monitoring specification (RMON); and
   a network management module connected to said switching section, said management module facilitating the exchange of management information among network devices connected to said ports, wherein said ports are arranged to operate in virtual local area networks ("LANs"), and wherein said network management module operates according to a simple network management protocol (SNMP) and said switch is secured with at least one of said network devices.

2. The switch according to claim 1, wherein said switch is located within at least one of said network devices.

3. The switch according to claim 1, wherein a router is connected to said first port.

4. The switch according to claim 3, wherein a virtual LAN comprises said first port and said second port, said router being connected to said first port, and a device selected from an automated teller machine LAN and a customer data LAN being connected to said second port.

5. The switch according to claim 1, wherein a first virtual LAN comprises said first port and said second port, and a second virtual LAN comprises said first port and said third port, and wherein a router is connected to said first port, an automated teller machine LAN is connected to said second port, and a customer data LAN is connected to said third port.

6. The switch according to claim 5, wherein said automated teller machine LAN comprises at least one automated teller machine.

7. The switch according to claim 5, wherein said customer data LAN comprises at least one cash register.

8. The switch according to claim 5, wherein said customer data LAN comprises at least one credit card processing terminal.

9. The switch according to claim 5 and further comprising a fourth port.

10. The switch according to claim 9, wherein said second virtual LAN further comprises said fourth port, and wherein a credit card terminal LAN is connected to said fourth port.

11. The switch according to claim 9, wherein a third virtual LAN comprises said first port and said fourth port, wherein said router is connected to said first port and a credit card terminal LAN is connected to said fourth port.

12. A system for switching data traffic over a communications network, comprising:
   a switch having at least first, second, and third ports for connecting network devices, said switch supporting a simple network management protocol (SNMP), a remote monitoring specification (RMON), and virtual local area networks ("LANs");
   a network device connected to each of at least three of said ports; and
   at least two virtual LANs, each of which includes at least two of said ports, wherein data traffic on each said virtual LAN is isolated from data traffic on other virtual LANs and wherein said switch is secured with at least one of said network devices.

13. The system according to claim 12, wherein a first virtual LAN comprises at least said first port and said second port;
   wherein a second virtual LAN comprises at least said first port and said third port;
   wherein a router is connected to said first port, said router capable of routing signals to an external network; and
   wherein said switch switches between said first and second virtual LANs in order to enable said external network to communicate alternately with said network devices connected to said second and third ports.

14. The system according to claim 13, wherein an automated teller machine LAN is connected to said second port and a customer data LAN is connected to said third port.

15. The system according to claim 13, and further comprising a fourth port, wherein a third virtual LAN comprises at least said first port and said fourth port,
   and wherein said switch switches among said first, second, and third virtual LANs.

16. The system according to claim 15, wherein a port of a second switch is connected to said fourth port and wherein network devices are connected to ports of said second switch and said ports of said second switch are arranged into virtual LANs.

17. The system according to claim 12 and further comprising a fourth port, wherein a first virtual LAN comprises at least said first port, said second port, and said third port and wherein a second virtual LAN comprises at least said third port and said fourth port.

18. The system according to claim 17, wherein a LAN is connected to said first port, a router is connected to said second port, a LAN supervisor is connected to said third port, and a server is connected to said fourth port, said router being capable of routing signals to an external network.

19. The system according to claim 17, wherein a first user is connected to said first port, a first router is connected to said second port, a second user is connected to said third port, and a second router is connected to said fourth port, said first router being capable of routing signals to a wide area network, and said second router being capable of routing signals to an external network.

* * * * *